(12) United States Patent
Singh et al.

(10) Patent No.: US 8,364,903 B2
(45) Date of Patent: Jan. 29, 2013

(54) FIELD LEVEL CONCURRENCY AND TRANSACTION CONTROL FOR OUT-OF-PROCESS OBJECT CACHING

(75) Inventors: Amit Singh, Irving, TX (US); Tarun Jindal, Irving, TX (US); Tao Yang, The Colony, TX (US); Fairborz Ebrahimi, Basking Ridge, NJ (US); Dinyar Kavouspour, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 626 days.

(21) Appl. No.: 12/644,125

(22) Filed: Dec. 22, 2009

(65) Prior Publication Data

US 2011/0154315 A1 Jun. 23, 2011

(51) Int. Cl.
*G06F 9/44* (2006.01)
*G06F 12/00* (2006.01)

(52) U.S. Cl. .......................... 711/141; 711/147; 717/171

(58) Field of Classification Search .................. 711/118, 711/141–143, 147; 717/171; 709/213
See application file for complete search history.

(56) References Cited

U.S. PATENT DOCUMENTS

| | | | | |
|---|---|---|---|---|
| 5,933,849 A | * | 8/1999 | Srbljic et al. .................. | 711/118 |
| 6,871,264 B2 | * | 3/2005 | Soltis, Jr. ...................... | 711/122 |
| 6,970,981 B2 | * | 11/2005 | Kanaley ........................ | 711/141 |
| 2003/0120873 A1 | * | 6/2003 | Kanaley ........................ | 711/141 |
| 2004/0054860 A1 | * | 3/2004 | Dixit et al. .................... | 711/160 |
| 2006/0155819 A1 | * | 7/2006 | Grabinar et al. .............. | 709/213 |
| 2008/0034165 A1 | * | 2/2008 | Iyengar et al. ................ | 711/141 |
| 2008/0256299 A1 | * | 10/2008 | Iyengar et al. ................ | 711/124 |
| 2011/0154315 A1 | * | 6/2011 | Singh et al. ................... | 717/171 |

* cited by examiner

*Primary Examiner* — Christopher B Shin

(57) ABSTRACT

A method includes executing a multi-threaded, object-oriented application (OOA) on a device; receiving, by multiple threads of the OOA, an object from an out-of-process cache memory; mutating one or more fields of the object, wherein the one or more fields correspond to one or more attributes of the object; and applying an update of the one or more fields that have been mutated to the out-of-process cache memory, wherein the applying the update updates the one or more fields mutated at a field level and not at an object level.

20 Claims, 8 Drawing Sheets

FIELD LEVEL CONCURRENCY AND TRANSACTION CONTROL FOR OUT-OF-PROCESS OBJECT CACHING

BACKGROUND

Large enterprise-class object-oriented applications (OOAs) may rely on out-of-process object caching solutions to provide high scalability and uninterrupted service in case an application server fails. Although usage of an out-of-process object caching solution may provide scalability and uninterrupted service, other problems may arise, such as response time and coherence of objects.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "field," as used herein, is intended to be broadly interpreted to include a characteristic or an attribute of an object.

The term "coherence," as used herein, is intended to be broadly interpreted to include a consistency of an object. By way of example, but not limited thereto, a shared object stored in a cache memory may be subject to changes or mutations to fields of the shared object by multiple threads of an OOA. In such instances, coherence of the shared object includes managing a solidarity associated with the temporal state changes of the shared object.

Figure 1:
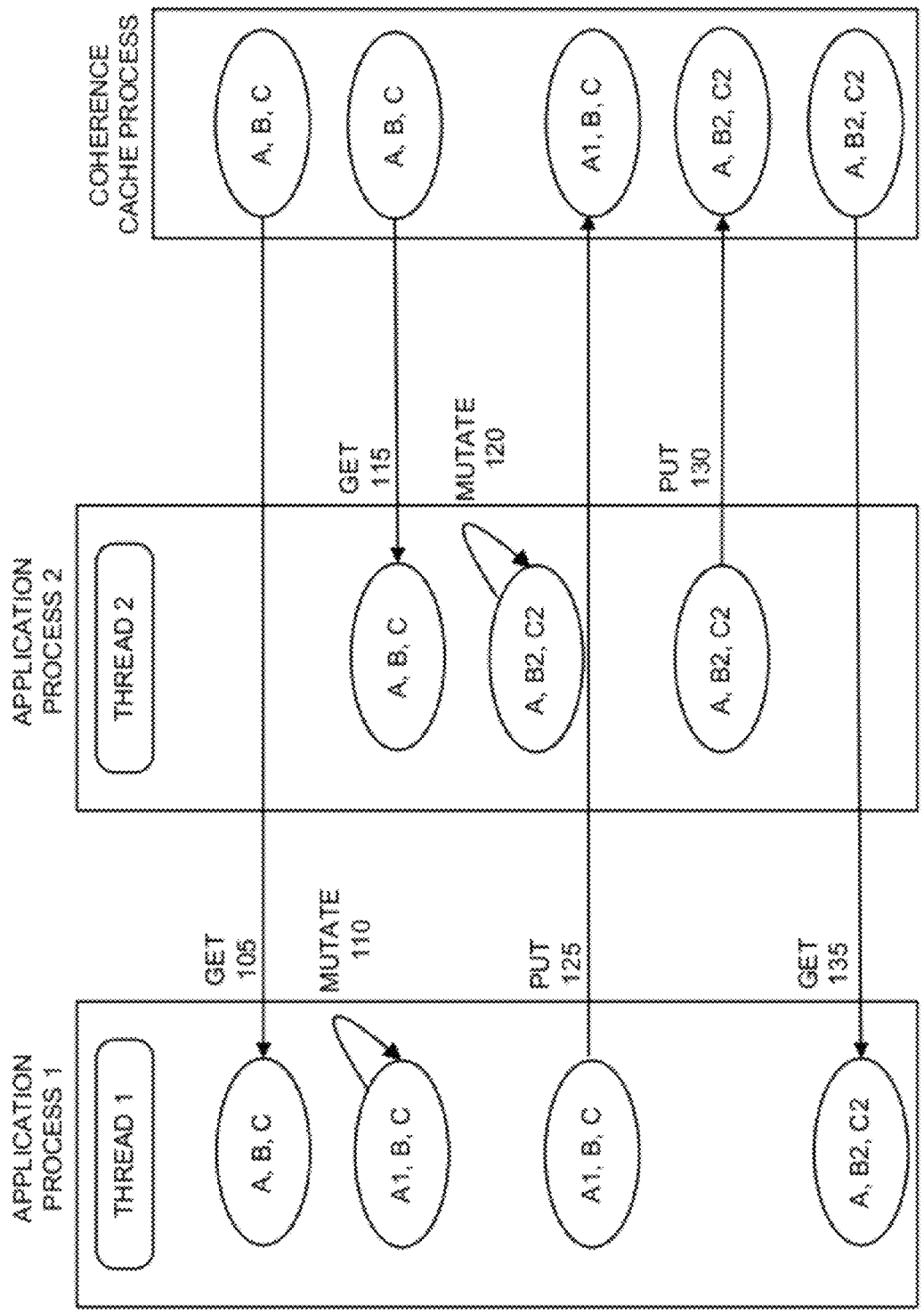
FIG. 1 is a diagram illustrating an implementation of integrating out-of-process object caching without isolation.

As the name suggests, out-of-process object caching may run outside of a corresponding application process. Typically, for a Java-based application, an out-of-process caching process may run in one or more Java Virtual Machines (JVMs). In multi-threaded, single or multiple JVM process applications, object level retrieval from and object level replacement to the out-of-process cache, by multiple threads on a shared object, may adversely impact the coherence of the shared object. FIG. 1 is a diagram illustrating an implementation of integrating out-of-process object caching without isolation. As illustrated, a multi-threaded application including thread 1 and thread 2 may be executing application processes 1 and 2, respectively. Referring to FIG. 1, thread 1 may get 105 an object (e.g., a copy of the object) from a cache memory. For purposes of discussion, the object may include fields A, B, and C. Thread 1 may cause field A of the object to mutate 110 to A1. Concurrently, thread 2 may also get 115 the object (e.g., the copy of the object) from the cache memory. Thread 2 may cause fields B and C of the object to mutate 120 to B2 and C2, respectively. During this time, thread 1 may put 125 the mutated object (e.g., A1, B, C) back to the cache memory. Subsequently, thread 2 may put 130 the mutated object (e.g., A, B2, C2) back to the cache memory. In such an instance, thread 2 is essentially overwriting the changes to field A of the object provided by thread 1. As further illustrated, subsequently, thread 1 may get 135 the overwritten object (e.g., A, B2, C2).

In this example, even though each of thread 1 and thread 2 is able to obtain a copy of the object without contention, object mutations that occur in overlapping time allows one thread (e.g., thread 2) to override a state of the object (e.g., one or more fields of the object) at the end of its transaction vis-à-vis another object mutation associated with another thread (e.g., thread 1). In such instances, coherence is not maintained and may, among other things, adversely impact application accuracy (e.g., object consistency).

Figure 2:
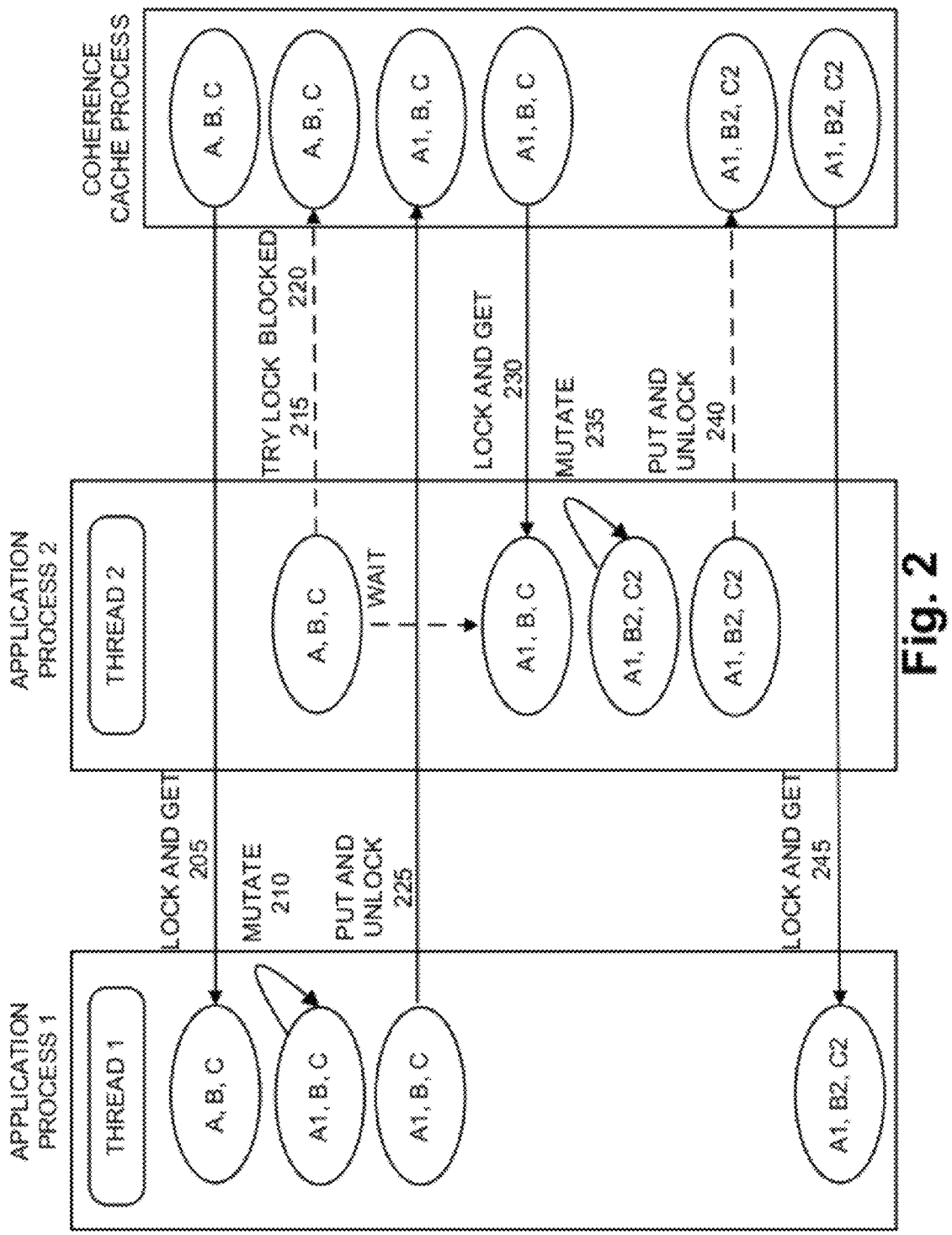
FIG. 2 is diagram illustrating an implementation of integrating out-of-process object caching with isolation.

One approach to avoid object overriding is to add isolation to transactions by utilizing a lock/unlock application programming interface (API). FIG. 2 is diagram illustrating an implementation of integrating out-of-process object caching with isolation. As illustrated, a multi-threaded application including thread 1 and thread 2 may be executing application processes 1 and 2, respectively. Referring to FIG. 2, thread 1 may lock and get 205 an object (e.g., a copy of the object) from a cache memory. For purposes of discussion, the object may include fields A, B, and C. Thread 1 may cause field A of the object to mutate 210 to A1. Concurrently, thread 2 may try lock 215 of the object, but may be blocked 220 since thread 1 has the object in a lock state. In this instance, thread 2 must wait.

Thread 1 may complete the mutation of field A of the object and put and unlock 225 the object (e.g., A1, B, C) to a cache memory. Thereafter, thread 2 may lock and get 230 the object (e.g., A1, B, C), which has been mutated by thread 1, from the cache memory. Thread 2 may cause fields B and C of the object to mutate 235 to B2 and C2, respectively. Thread 2 may put and unlock 240 the object (e.g., A1, B2, C2) into the cache memory. Thread 1 may lock and get 245 the object that includes the collective mutations of the object previously applied by thread 1 and thread 2.

In this example, object level retrieval from and object level replacement to the out-of-process cache memory may not cause a disruption in coherence due to the locking and unlocking of objects. However, threads must process shared objects in a serial manner, which causes, among other things, time inefficiencies, disruption of application flow, etc.

According to an exemplary embodiment, in a multi-threaded, single or multiple JVM-based application, threads may mutate objects at the field level and update the object in the cache memory by providing only the mutated field of the object to the cache memory versus replacing the entire object. The exemplary embodiment may be applicable to single or multiple JVMs in which multiple threads may mutate disjoint fields of a shared object.

Figure 3:
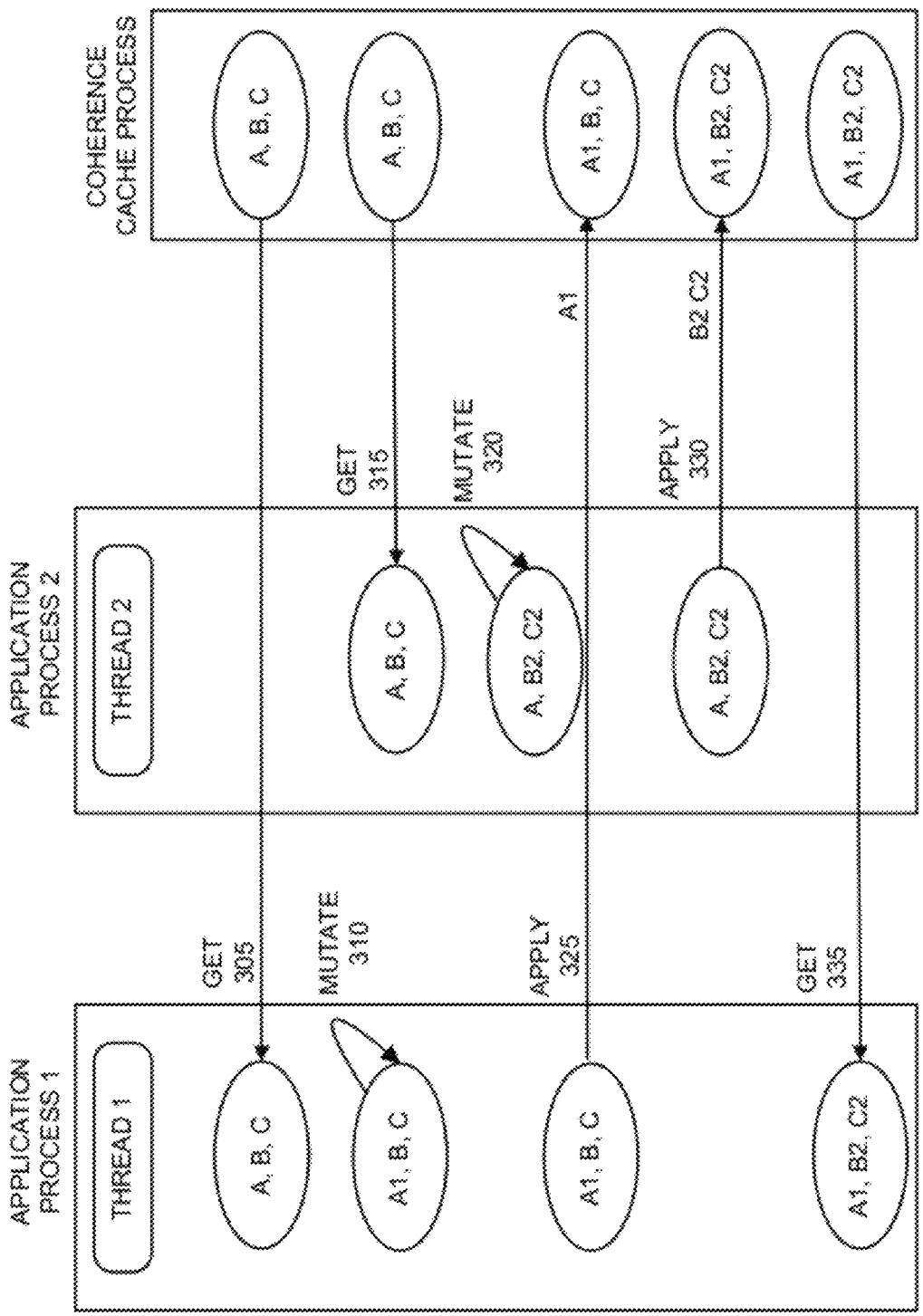
FIG. 3 is a diagram illustrating an exemplary embodiment in which integration of out-of-process object caching with field level concurrency may be implemented.

FIG. 3 is a diagram illustrating an exemplary embodiment in which integration of out-of-process object caching with field level concurrency may be implemented. As illustrated, a multi-threaded application including thread 1 and thread 2 may be executing application processes 1 and 2, respectively. Referring to FIG. 3, thread 1 may get 305 an object (e.g., a copy of the object) from a cache memory. For purposes of discussion, the object may include fields A, B, and C. Thread 1 may cause field A of the object to mutate 310 to A1. Concurrently, thread 2 may get 315 the object (e.g., a copy of the object) from the cache memory. Thread 2 may cause fields B and C of the object to mutate 320 to B2 and C2, respectively.

As further illustrated in FIG. 3, thread 1 may apply 325 field A1 to the cache memory. Thread 2 may apply 330 field B2 and field C2 to the cache memory. As will be described in greater detail below, a synchronization mechanism may coordinate the updating of fields associated with the object to the cache memory. Thereafter, thread 1 may get 335 the updated object that includes the updated fields (e.g., A1, B2, C2) from the cache memory.

As a result of the foregoing, multiple threads may mutate disjoint fields of the shared object in parallel while maintaining the coherence of the shared object. In this way, application performance, reliability, consistency, etc., may not be compromised.

Since an exemplary embodiment has been broadly described, a more detailed description of this embodiment and other exemplary embodiments are provided below.

Figure 4:
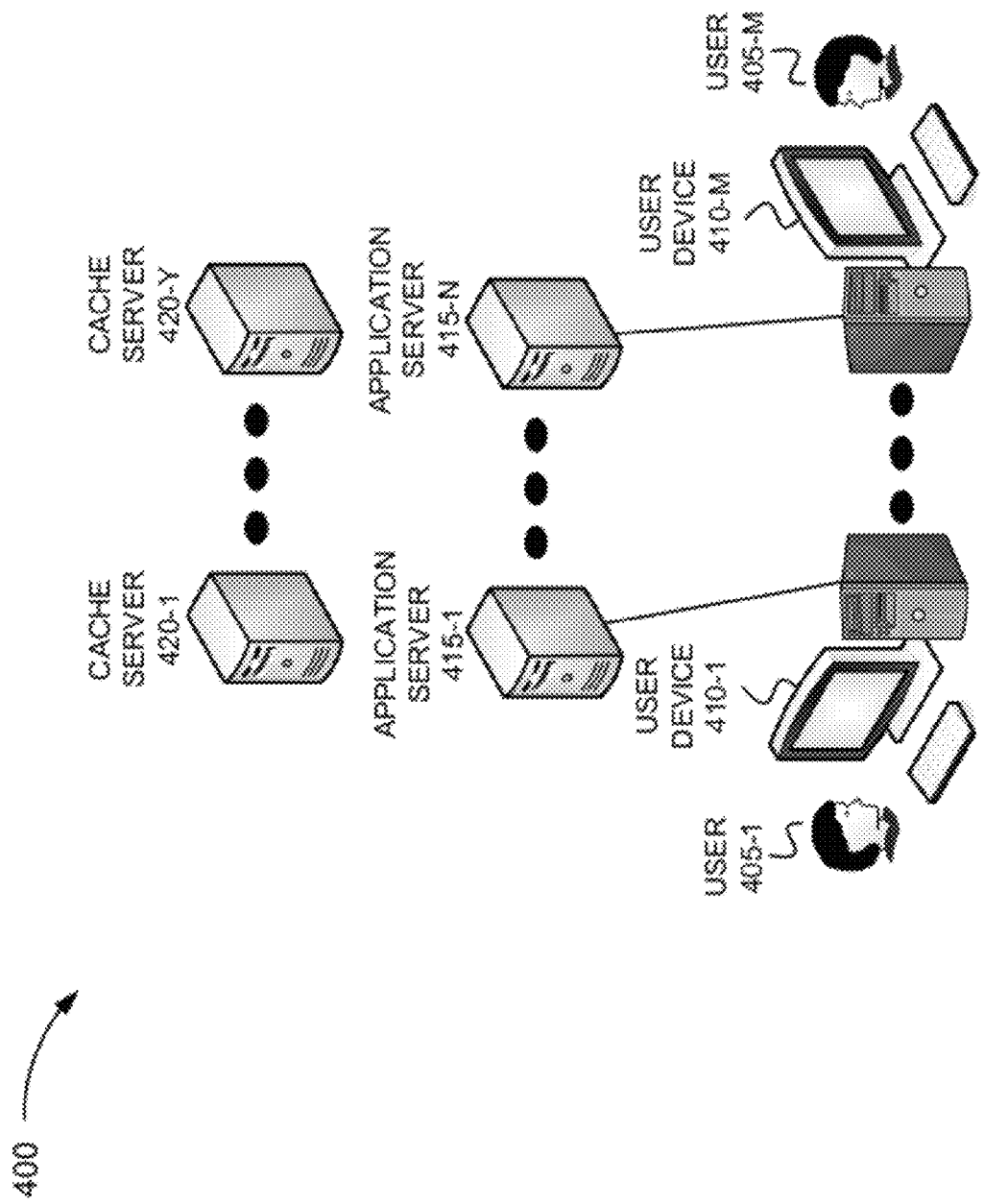
FIG. 4 is a diagram illustrating an exemplary environment in which out-of-process object caching with field level concurrency may be implemented.

Single or multiple JVM-based applications that utilize out-of-process caching has wide applicability. By way of example, but not limited thereto, web-based systems, client/server systems, peer-to-peer systems, etc., may employ this type of architecture. FIG. 4 is a diagram illustrating an exemplary environment in which out-of-process object caching with field level concurrency may be implemented. As illustrated in FIG. 4, exemplary environment 400 may include users 405-1 through 405-M (referred to generally as users 405 or user 405), user devices 410-1 through 410-M (referred to generally as user device 410 or user device 410), application servers 415-1 through 415-N (referred to generally as application servers 415 or application server 415), and cache servers 420-1 through 420-Y (referred to generally as cache servers 420 or cache server 420).

The number of devices and configuration in environment 400 is exemplary and provided for simplicity. In practice, environment 400 may include more devices, fewer devices, different devices, and/or differently arranged devices than those illustrated in FIG. 4. For example, application server 415 and cache server 420 may be combined into a single device. In such an implementation, there may exist separate process boundaries between the application server 415 and cache server 420. Also, some functions described as being performed by a particular device may be performed by a different device or a combination of devices. Environment 400 may include wired and/or wireless connections among the devices illustrated.

User device 410 may include a computational device having the capability to communicate with other devices, systems, networks, and/or the like. By way of example, but not limited thereto, user device 410 may correspond to a mobile telephone, a computer (e.g., a desktop, a laptop, a palmtop, etc.), a personal digital assistant (PDA), a personal communication system (PCS) terminal, a pervasive computing device, and/or some other type of mobile device or stationary device.

Application server 415 may include a computational device having the capability to communicate with other devices, systems, networks, and/or the like. For example, application server 415 may include a computer, a server, or some other type of device. In an exemplary implementation, application server 415 may include one or more multi-threaded JVM-based applications. By way of example, but not limited thereto, one or more of the multi-threaded JVM-based applications may provide services to users 405.

Cache server 420 may include a computational device having the capability to communicate with other devices, systems, networks, and/or the like. For example, cache server 420 may include a computer, a server, or some other type of device. In an exemplary implementation, cache server 420 may store and manage one or more databases of objects (e.g., master copies of objects, shared objects, etc.) which may be utilized by multi-threaded JVM-based applications residing on application server 415.

Figure 5:
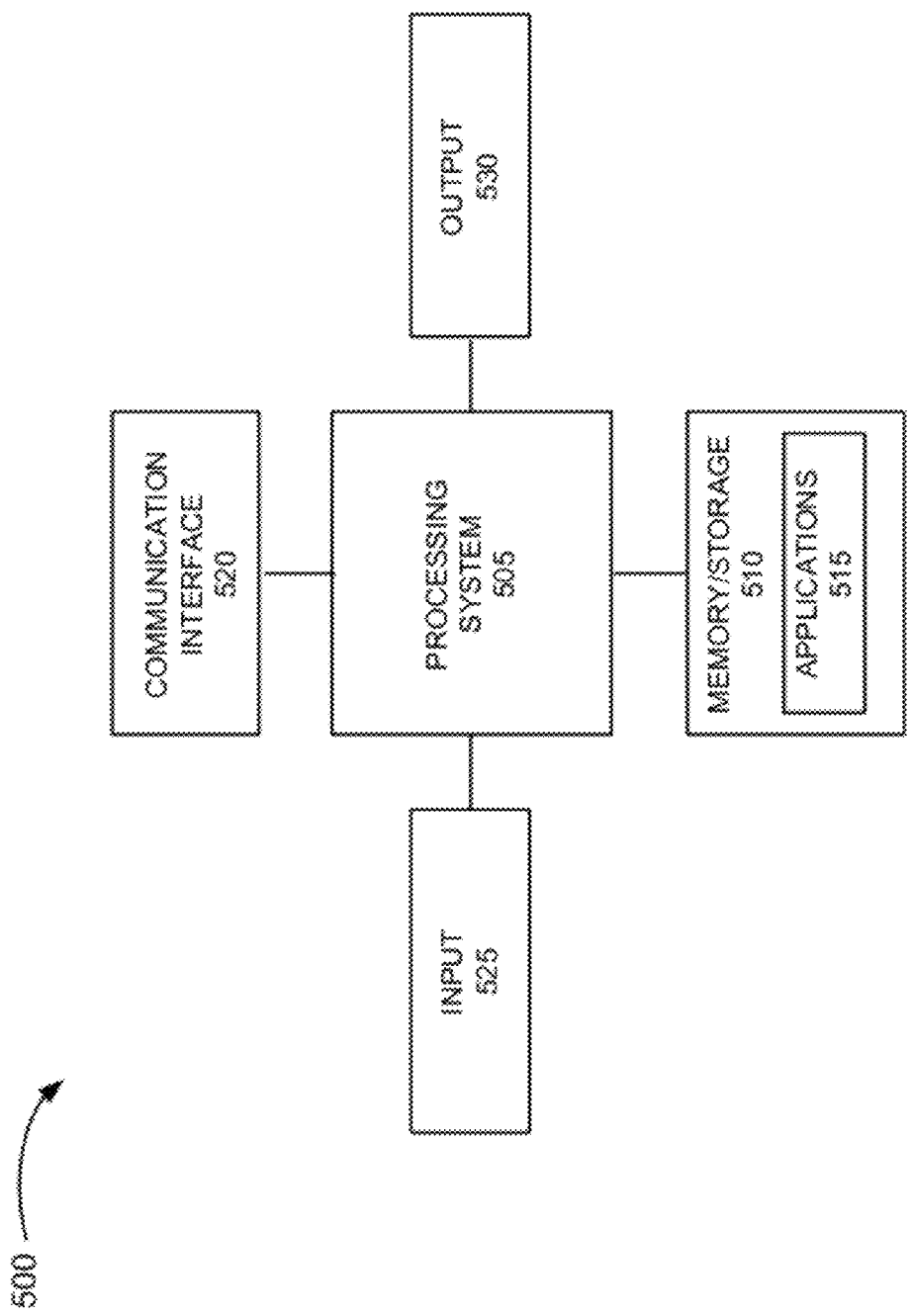
FIG. 5 is a diagram illustrating exemplary components of a device that may correspond to one or more of the devices in the exemplary environment depicted in FIG. 4.

FIG. 5 is a diagram illustrating exemplary components of a device 500 that may correspond to one or more of the devices in environment 400. For example, device 500 may correspond to user device 410, application server 415, and/or cache server 420. As illustrated, device 500 may include a processing system 505, memory/storage 510 including applications 515, a communication interface 520, an input 525, and an output 530. In other implementations, device 500 may include fewer components, additional components, different components, and/or a different arrangement of components than those illustrated in FIG. 5 and described herein.

Processing system 505 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 505 may control the overall operation, or a portion thereof, of device 500, based on, for example, an operating system and/or various applications (e.g., applications 515).

Memory/storage 510 may include one or more memories and/or one or more secondary storages. For example, memory/storage 510 may include a random access memory (RAM), a dynamic random access memory (DRAM), a read only memory (ROM), a programmable read only memory (PROM), a flash memory, and/or some other type of memory. Memory/storage 510 may include a hard disk (e.g., a magnetic disk, an optical disk, a magneto-optic disk, a solid state disk, etc.) or some other type of computer-readable medium, along with a corresponding drive. Memory/storage 510 may include a memory, a storage device, or storage component that is external to and/or removable from device 500, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 510 may store data, application(s), and/or instructions related to the operation of device 500.

Applications 515 may include software that provides various services or functions. For example, with reference to application server 415, applications 515 may include one or more multi-threaded JVM-based application. Additionally, with reference to application server 415, applications 515 may include one or more applications that provide for data (e.g., object) coherence with respect to an out-of-process cache architecture. Additionally, with reference to cache server 420, applications 515 may include one or more applications that provide data (e.g., object) coherence with respect to an out-of-process cache architecture.

Communication interface 520 may permit device 500 to communicate with other devices, networks, systems and/or the like. Communication interface 520 may include one or more wireless interfaces and/or wired interfaces.

Input 525 may permit an input into device 500. For example, input 525 may include a button, a keypad, a knob, a touchpad, a keyboard, an input port, a display, a microphone, voice recognition logic, fingerprint recognition logic, a web cam, and/or some other type of input component.

Output 530 may permit device 500 to provide an output. For example, output 530 may include a display, light emitting diodes (LEDs), an output port, speakers, a vibratory mechanism, and/or some type of output component.

As described herein, device 500 may perform operations in response to processing system 505 executing software instructions contained in a computer-readable medium, such as memory/storage 510. The software instructions may be read into memory/storage 510 from another computer-readable medium or from another device via communication interface 520. The software instructions contained in memory/storage 510 may cause processing system 505 to perform processes described herein. Alternatively, hardwired circuitry may be used in place of or in combination with software instructions to implement processes described herein. Thus, implementations described herein are not limited to any specific combination of hardware circuitry and software.

As previously described, multi-threaded JVM-based applications may update fields of a shared object with respect to an out-of-process cache. Described below are exemplary functional components associated with application server 415 and cache server 420.

Figure 6B:
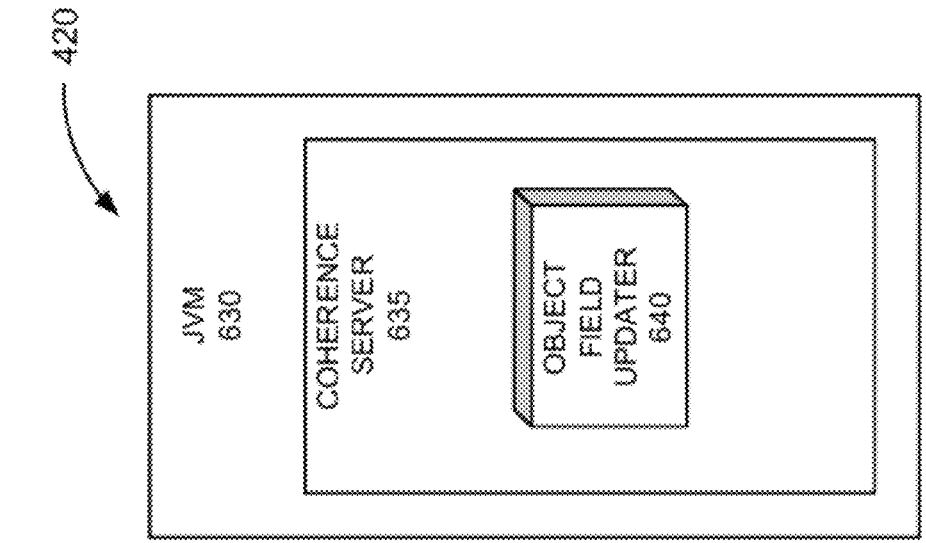
FIG. 6B is a diagram illustrating exemplary functional components associated with an exemplary implementation of a cache server.
Figure 6A:
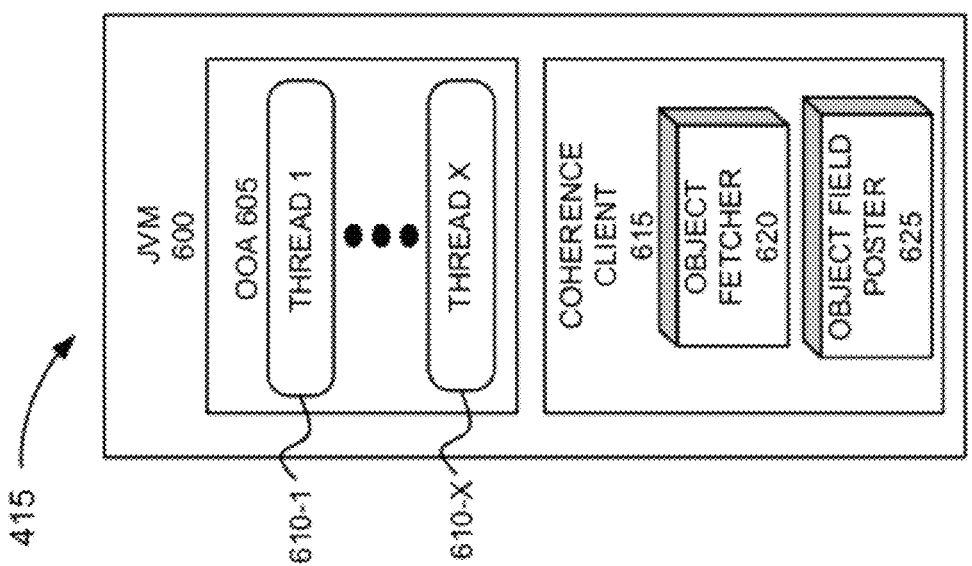
FIG. 6A is a diagram illustrating exemplary functional components associated with an exemplary implementation of an application server.

FIG. 6A is a diagram illustrating exemplary functional components associated with an exemplary implementation of application server 415. Referring to FIG. 6A, application server 415 may include a JVM 600. JVM 600 may include a multi-threaded OOA 605 that includes threads 610-1 through 610-X (referred to generally as threads 610 or thread 610). JVM 600 may include a coherence client 615 that may include, among other things, an object fetcher 620 and an object field poster 625.

JVM 600 may include a Java Virtual Machine. By way of example, but not limited thereto, although not illustrated, JVM 600 may include a class loader subsystem and an execution engine. JVM 600 may also organize the memory it needs to execute a program (e.g., a method area, a heap, a Java stack, program counter registers, etc.).

Multi-threaded OOA 605 may include an object-oriented application. By way of example, but not limited thereto, multi-threaded OOA 605 may correspond to a multi-threaded Java application, a multi-threaded C++ application, or a multi-threaded .NET application. Threads 610 may include processes of execution associated with multi-threaded OOA 605. In an exemplary implementation, as illustrated in FIG. 6A, multi-threaded OOA 605 may correspond to a multi-threaded, multi-JVM-based application.

In an exemplary embodiment, multi-threaded OOA 605 may collect field mutations of one or more objects from one or more threads 610. In some instances, the one or more objects may correspond to one or more shared objects. Additionally, multi-threaded OOA 605 may determine when the one or more fields of the one or more objects may be updated to an out-of-process cache memory. By way of example, but not limited thereto, multi-threaded OOA 605 and/or thread 610 may determine when the shared object may be updated to the cache memory based on shared object and/or field(s) of shared object visibility, a scope of a call method, and/or an application flow. For example, assume that thread 610-1 (e.g., thread1) gains visibility of the shared object during execution of a method (e.g., a method A). Thereafter, either the method A may mutate one or more fields of the shared object directly or may pass the reference of the shared object to one or more other methods. For example, assume that the method A may pass the reference of the shared object to a chain of methods (e.g., a method B, a method C, a method D, etc.) which may mutate one or more fields of the shared object.

Thread 610-1 (e.g., thread 1) may apply one or more field mutations of the shared object to a local copy of the shared object. In addition, thread 610-1 may start recording mutations performed by the chain of methods (e.g., the method B, the method C, etc.) associated with thread 1. Subsequently, the chain of methods may complete their mutations and return the shared object to the method A. The method A may then make a last mutation to one or more fields of the shared object. The method A may send a batch of field-level updates to the cache memory, which may include the mutations collected during a recording of the mutations performed by the chain of methods. In other words, thread 610 may start collecting mutations of the shared object when the shared object may be visible to thread 610 and may then apply the collected mutations to the cache memory before thread 610 may lose visibility of the shared object.

In another exemplary implementation, thread 610 may decide to send an update (e.g., a batch update) for the shared object to the cache memory based on thread notification/communication boundaries. By way of example, but not limited thereto, assume thread 610-1 (e.g., thread 1) mutates one or more fields of the shared object. Thereafter, thread 610-1 may notify another thread 610-2 (e.g., thread2) for various reasons (e.g., thread 610-1 has reached a certain logical point in the application flow). In an exemplary case, thread 610-2 may work on the same shared object and may perform its own mutations on one or more fields of the shared object. In this way, thread notification/communication boundaries may provide a basis for sending an update (e.g., a batch update) of the shared object to the cache memory.

Coherence client 615 may manage the coherence of objects utilized by multi-threaded OOA 605. In an exemplary implementation, as previously described, coherence client 615 may include, among other functional components, object fetcher 620 and object field poster 625. Object fetcher 620 may fetch objects from a cache memory (e.g., residing on cache server 420). By way of example, but not limited thereto, object fetcher 620 may receive a call from multi-threaded OOA 605 to get one or more objects. Object fetcher 620 may retrieve the one or more objects from the cache memory and pass the one or more objects to multi-threaded OOA 605. Threads 610 of multi-threaded OOA 605 may then mutate one or more fields of the one or more objects, which may be stored locally on application server 415. In some instances, the one or more objects may correspond to one or more shared objects. In other instances, the one or more objects may not correspond to one or more shared objects.

Object field poster 625 may post updates of objects or one or more fields of objects to a cache memory (e.g., residing on cache server 420). By way of example, but not limited thereto, object field poster 625 may receive a call from multi-threaded OOA 605 to post updates to one or more objects. In some instances, the update may correspond to a replacement post (e.g., updating an object at an object level). In other instances, the update may correspond to a field post (e.g., updating an object at a field level).

Although FIG. 6A illustrates exemplary functional components of an exemplary application server 415, in other implementations, application server 415 may include fewer functional components, additional functional components, different functional components, and/or a different arrangement of functional components than those illustrated in FIG. 6A and described. Additionally, or alternatively, one or more operations described as being performed by a particular functional component may be performed by one or more other functional components, in addition to or instead of the particular functional component.

FIG. 6B is a diagram illustrating exemplary functional components associated with an exemplary implementation of cache server 420. Referring to FIG. 6B, cache server 420 may include a JVM 630 and a coherence server 635 that may include, among other things, an object field updater 640.

JVM 630 may include a Java Virtual Machine. By way of example, but not limited thereto, although not illustrated, JVM 630 may include a class loader subsystem and an execution engine. JVM 630 may also organize the memory it needs to execute a program (e.g., a method area, heap, Java stacks, program counter registers, etc.).

Coherence server 635 may manage the coherence of objects utilized by multi-threaded OOA 605 (e.g., a multi-threaded, single or multiple JVM-based application). In an exemplary implementation, as previously described, coherence server 635 may include, among other functional components, object field updater 405. Object field updater 640 may manage the updating of objects and one or more fields of objects (e.g., master copies of objects, fields, etc.) stored in a cache memory. In an exemplary implementation, object field updater 640 may manage a queue (e.g., first-in first-out (FIFO) queue) to which updates to objects and fields of objects may be posted by object field poster 625 of coherence client 615. In this way, a synchronization mechanism is provided for updating objects (e.g., at an object level) and fields of objects (e.g., at a field level). Object field updater 640 may store the updates to objects and fields of an object to the cache memory as such updates may be received by the queue.

Although FIG. 6B illustrates exemplary functional components of cache server 420, in other implementations, cache server 420 may include fewer functional components, additional functional components, different functional components, and/or a different arrangement of functional components than those illustrated in FIG. 6B and described. Additionally, or alternatively, one or more operations described as being performed by a particular functional component may be performed by one or more other functional components, in addition to or instead of the particular functional component.

Figure 6C:
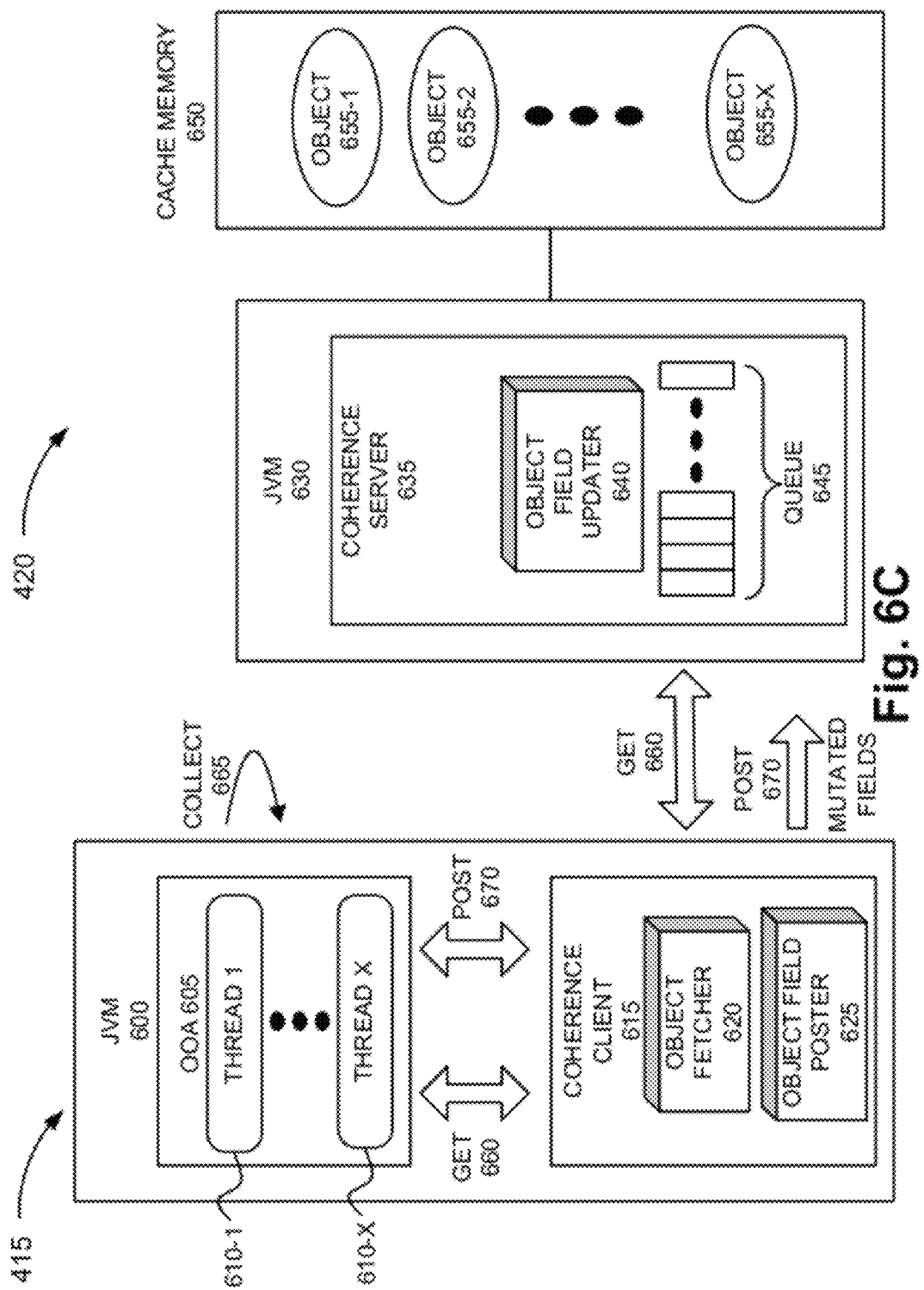
FIG. 6C is a diagram illustrating exemplary processes that may be performed by the functional components associated with the application server and the cache server.

FIG. 6C is a diagram illustrating exemplary processes that may be performed by the functional components associated with application server 415 and cache server 420. In an exemplary case, multi-threaded OOA 605 (e.g., a multi-threaded, multi-JVM-based application) may be executing on application server 415. As illustrated, object field updater 640 may include a queue 645 to receive object level or field level updates from object field poster 625. Additionally, as further illustrated, cache server 420 may include a cache memory 650 (e.g., an out-of-process cache memory) that stores objects 655-1 through 655-X (referred to generally as objects 655 or object 655).

Referring to FIG. 6C, it may be assumed that multi-threaded OOA 605 may be executing and issues a call (e.g., a get 660) to coherence client 615 to obtain one of objects 655 from cache memory 650 via coherence server 620. Based on the call (i.e., get 660), object fetcher 620 of coherence client 615 may retrieve the object and pass it to multi-threaded OOA 605. In this example, it may be assumed that the object corresponds to a shared object and that one or more threads 610 may mutate one or more fields of the shared object. Additionally, it may be assumed that the shared object and/or the one or more fields of the shared object remain visible to one of threads 610. In such an instance, multi-threaded OOA 605 may collect 665 the one or more fields that have been mutated. For example, multi-threaded OOA 605 may collect the one or more fields of the shared object as the one or more fields are being mutated by one or more threads 610

In an exemplary implementation, based on the application flow, multi-threaded OOA 605 may determine to update the mutated fields to cache memory 650. In such an instance, in an exemplary implementation, multi-threaded OOA 605 may issue a call (e.g., a post 670) to coherence client 615. Post 670 may indicate to coherence client 615 to update the mutated fields of the shared object to cache memory 650.

Object field poster 625 may receive post 670 and may provide post 670 to cache server 420. As previously described, in an exemplary implementation, object field updater 640 may manage queue 645 that the mutated fields of the shared object. Object field updater 640 may update the mutated fields of the shared object in cache memory 650 according to an order in which the update (e.g., post 670) is received in queue 645.

Figure 7:
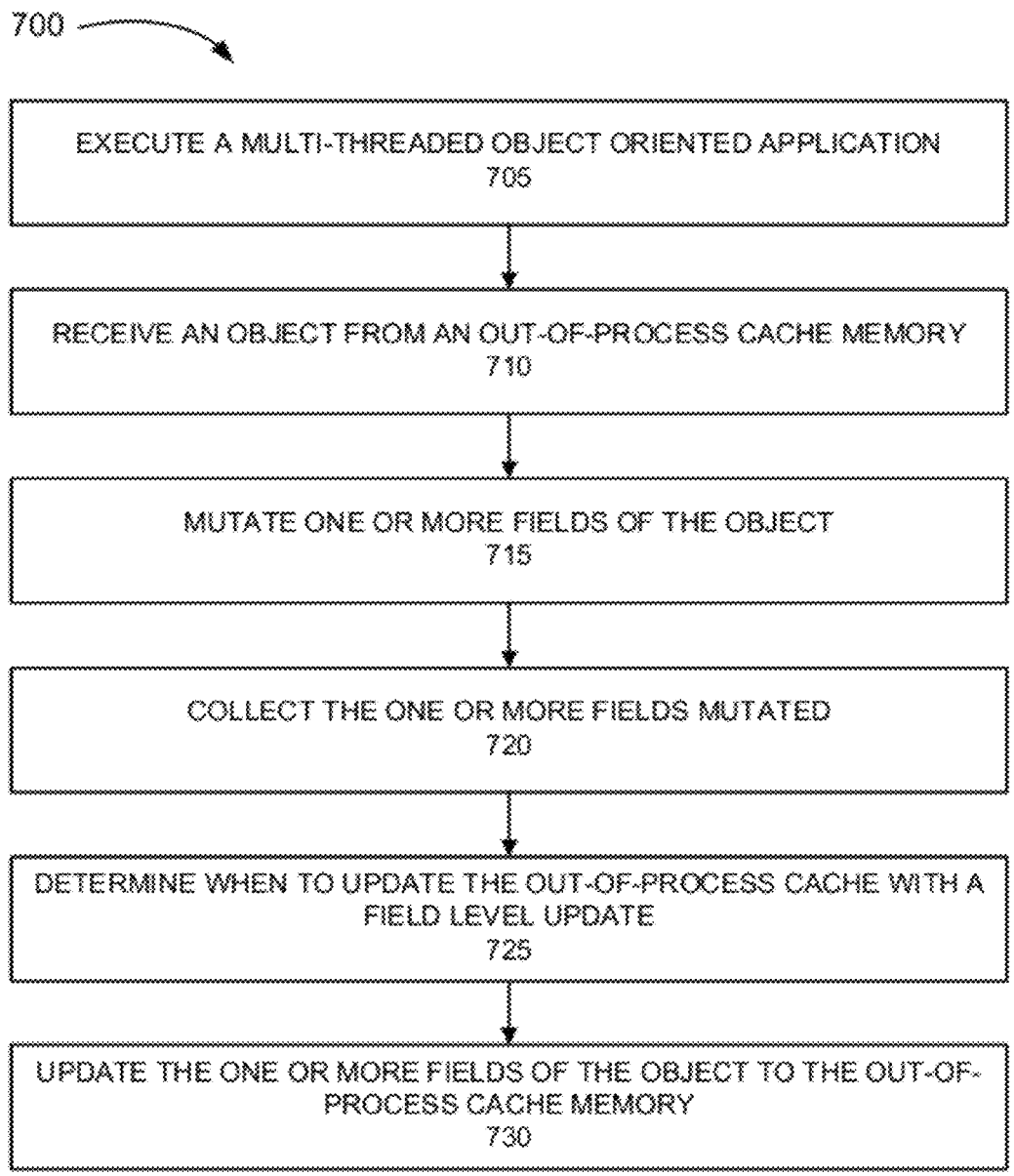
FIG. 7 is a flow diagram illustrating an exemplary process in which field level updates of an object to an out-of-process cache memory may be implemented.

FIG. 7 is a flow diagram illustrating an exemplary process 700 in which field level updates of an object to an out-of-process cache memory may be implemented. In an exemplary implementation, process 700 may be performed cooperatively by application server 415 and a cache server 420. It may be assumed that a mutation of a field of an object may be actuated from a user request associated with an application flow of a multi-threaded JVM-based application and/or a non-user request (e.g., a routine process, monitoring activities, cleanup activities, daemon processes, etc.) associated with the application flow of the multi-threaded JVM-based application.

Process 700 may include executing a multi-threaded OOA (block 705). For example, application server 415 may execute a multi-threaded, single or multiple JVM-based application. In an exemplary implementation, the multi-threaded JVM-based application may provide services to one or more users. It may be assumed that multiple threads may be executing.

An object from an out-of-process cache memory may be received (block 710). For example, object fetcher 620 of coherence client 615 may get an object from cache memory 650 via coherence server 620 of cache server 420. In an exemplary implementation, object fetcher 620 may get the object based on a call from the multi-threaded JVM-based application. The object may be provided to the multi-threaded JVM-based application. In an exemplary implementation, the object may correspond to a shared object.

One or more fields of the object may be mutated (block 715). For example, one or more threads may mutate one or more fields of the object. In an exemplary implementation, the one or more fields mutated may be disjoint with respect to each thread.

The one or more fields mutated may be collected (block 720). For example, as previously described, the JVM-based application or one or more of threads 610 may collect one or more fields of the object, which have been mutated.

It may be determined when to update the out-of-process cache with a field level update (block 725). For example, as previously described, the JVM-based application or one or more threads 610 may determine when to update cache memory 650 at a field level. By way of example, but not limited thereto, the JVM-based application or one or more threads 610 may determine when to update cache memory 650 at a field level based on a visibility of the shared object and/or field(s) of the shared object, a scope of a call method, an application flow, etc.

In an exemplary implementation, when the JVM-based application or one or more threads 610 may determine to update cache memory 650 at the field level, the JVM-based application or one or more threads 610 may issue a call to coherence client 615. In some instances, the call may include a batch, field level update of the shared object.

One or more fields of the object may be updated to the out-of-process cache memory (block 730). For example, object field poster 625 of coherence client 605 may receive the call and apply each updated field of the object to cache memory 650 via object field updater 640 of coherence server 620. As previously described, in an exemplary implementation, object field updater 645 may manage a queue 645 to receive field level updates associated with an object from multiple threads. Object field updater 640 may update the fields in accordance with queue 645. By way of example, but not limited thereto, queue 645 may correspond to a FIFO queue.

Although FIG. 7 illustrates an exemplary process 700 in which field level updates of an object to an out-of-process cache memory may be implemented, in other implementations, process 700 may include additional operations, fewer operations, and/or different operations than those illustrated in FIG. 7 and described. For example, multi-threaded OOA 605 may update at the object level. Additionally, multi-threaded OOA 605 may update fields of a shared object when the mutations of fields may not be disjoint.

The foregoing description of implementations provides illustration, but is not intended to be exhaustive or to limit the implementations to the precise form disclosed. Accordingly, modifications to the implementations described herein may be possible. For example, although this description has described exemplary embodiments with respect to the JAVA programming language, in other implementations, object-oriented programming languages, other than JAVA may be utilized. By way of example, but not limited thereto, in other embodiments, the C++ programming language and the .NET programming language may be implemented.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 7, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" that performs one or more functions. This logic may include hardware, such as one or more processors, one or more microprocessors, one or more ASICs, one or more FPGAs, etc., software, or a combination of hardware and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
    executing a multi-threaded, object-oriented application (OOA) on a device;
    receiving, by multiple threads of the OOA, an object from an out-of-process cache memory;
    mutating one or more fields of the object, wherein the one or more fields correspond to one or more attributes of the object; and
    applying an update of the one or more fields that have been mutated to the out-of-process cache memory, wherein the applying the update updates the one or more fields mutated at a field level and not at an object level.

2. The method of claim 1, wherein the one or more fields are disjoint with respect to each thread.

3. The method of claim 1, further comprising:
    collecting the one or more fields of the object as the one or more fields are being mutated.

4. The method of claim 1, further comprising:
    determining when the one or more fields mutated are to be updated to the out-of-process cache.

5. The method of claim 4, wherein the determining is based on the multi-threaded OOA's visibility of the object or a thread notification boundary, wherein the object corresponds to a shared object.

6. The method of claim 1, wherein the multi-threaded OOA includes a JAVA application.

7. The method of claim 1, wherein the mutating comprises:
    receiving at least one of a user request to cause the one or more fields to be mutated or a non-user request to cause the one or more fields to be mutated.

8. The method of claim 7, wherein the non-user request comprises a daemon process.

9. A device comprising:
    one or more memories to store instructions; and
    one or more processing systems to execute the instructions in the one or more memories to:
        execute a multi-threaded, object-oriented application (OOA);
        obtain a shared object by multiple threads of the OOA;
        mutate one or more fields of the shared object; and
        apply an update of the one or more fields mutated to an out-of-process cache memory, wherein the applying updates the one or more fields mutated at a field level and not at an object level.

10. The device of claim 9, wherein the device comprises an application server.

11. The device of claim 9, wherein the one or more fields are disjoint with respect to each of the multiple threads.

12. The device of claim 9, wherein the one or more processing systems execute the instructions to:
   determine when the one or more fields of the shared object are to be updated to the out-of-process cache, wherein the determining is based on a visibility of the shared object associated with at least one of the multiple threads.

13. The device of claim 9, wherein the one or more processing systems execute the instructions to:
   collect the one or more fields of the shared object as the one or more fields are being mutated, wherein the one or more fields are disjoint; and
   issue a command to a coherence client to apply the update of the one or more fields collected to the out-of-process cache.

14. The device of claim 9, wherein the one or more processing systems execute the instructions to:
   issue a command to a coherence client to apply the update of the one or more fields when the shared object goes outside a scope of a method call associated with at least one of the multiple threads.

15. The device of claim 9, wherein the multi-threaded OOA comprises one of a JAVA application, a C++ application, or a .NET application.

16. One or more computer-readable media containing instructions executable by at least one processor, the one or more computer-readable media storing instructions to:
   execute a multi-threaded, object-oriented application (OOA);
   obtain a shared object by multiple threads of the OOA;
   mutate one or more fields of the shared object;
   determine when the one or more fields are to be updated to an out-of-process cache memory; and
   apply an update of the one or more fields mutated to the out-of-process cache memory, wherein the applying updates the one or more fields mutated at a field level and not at an object level.

17. The one or more computer-readable media of claim 16, wherein the one or more fields are disjoint fields.

18. The one or more computer-readable media of claim 16, wherein the multi-threaded OOA comprises one of a JAVA application, a C++ application, or a .NET application.

19. The one or more computer-readable media of claim 16, further storing one or more instructions to:
   collect the one or more fields of the shared object as the one or more fields are being mutated; and
   issue a command to apply the update in a batch fashion.

20. The one or more computer-readable media of claim 16, wherein the instructions to determine comprise one or more instructions to:
   determine based on a visibility of the shared object associated with at least one of the multiple threads.

* * * * *